Nov. 7, 1933.  J. L. PRICE  1,933,930
DISK BRAKE
Original Filed April 13, 1925
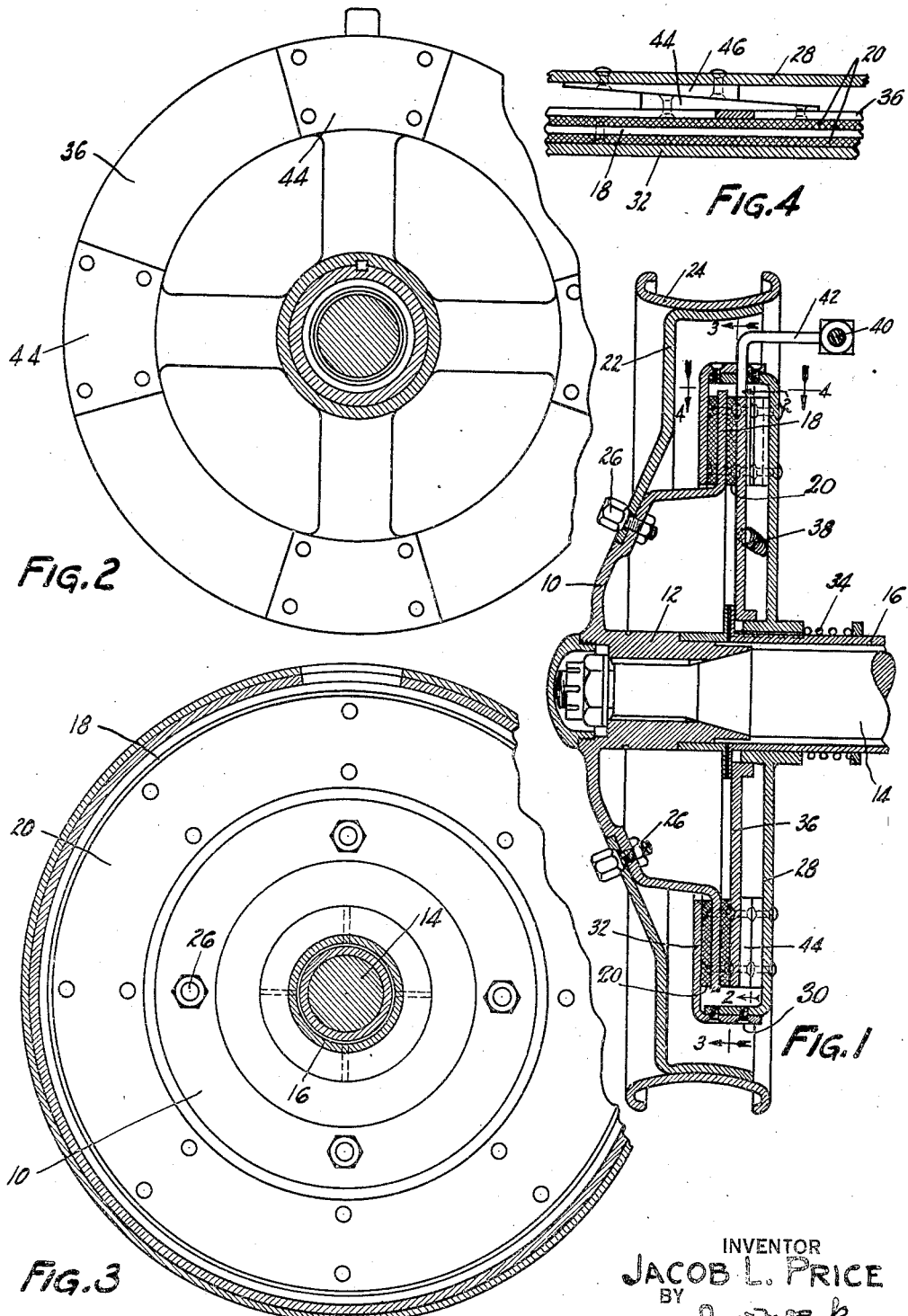
INVENTOR
JACOB L. PRICE
BY
ATTORNEY Patented Nov. 7, 1933

1,933,930

UNITED STATES PATENT OFFICE 1,933,930

DISK BRAKE

Jacob L. Price, New York, N. Y., assignor to Bendix Brake Company, Chicago, Ill., a corporation of Illinois Original application April 13, 1925, Serial No. 22,744. Divided and this application October 12, 1927. Serial No. 225,627

7 Claims. (Cl. 188—72)

This invention relates to disk brakes, and is illustrated as embodied in an automobile brake. Various important features of the invention relate to the construction and mounting of the nonrotatable parts of the brake, which embody substantial novelty in themselves and in their relation to a rotatable disk or drum member, and which will be apparent from the following description of one illustrative embodiment shown in the accompanying drawing, in which:

Figure 1 is a vertical transverse section through one wheel and brake;

Figure 2 is a vertical longitudinal section on the line 2—2 of Figure 1, showing the inner face of one of the nonrotatable disks;

Figure 3 is a vertical longitudinal section on the line 3—3 of Figure 1, showing the rotatable disk in side elevation; and Figure 4 is a horizontal section on the line 4—4 of Figure 1, showing two of the wedges in top plan.

In the arrangement selected for illustration, one member or disk of the brake is a drum-shaped part 10, integral with or secured to a hub 12 keyed on one live axle 14 of a semi-floating axle having a housing 16, although obviously the device is readily adaptable for use on other types of axles. The outer part of member 10 is in the form of a radial flat flange 18 constituting one disk of the brake, and shown as having the brake lining 20 riveted or otherwise secured to its opposite sides.

The remainder of the wheel is in the form of an annulus 22 secured in any desired manner to a tire-carrying rim 24, and shown as fitting at its inner edge in a rabbeted portion of member 10 and demountably fastened by bolts 26. Thus the brake member 10 and the annulus 22 in effect form a disk wheel. This novel wheel construction is covered by my prior application No. 22,744, filed April 13, 1925, from which the present application is divided.

Loosely keyed on housing 16, so that it may have sufficient universal movement to aline itself into parallelism with flange 18, is a nonrotatable backing member 28, to which is detachably fastened at its edge by machine screws 30, or by bolts, an overhanging flange 32 engageable with the lining of flange 18 by axial movement of the backing member 28 against the resistance of a spring 34.

This movement may be effected by rocking a disk 36 against the resistance of one or more springs 38 by means of a link 40 connected to an arm 42 projecting through a slot in the overlapping parts of the backing member 28 and the overhanging flange 32. Disk 36 is formed on the left (Figure 1) for engagement with the brake lining on the right of flange 18, while on its back are secured a series of wedges 44 engaging wedges 46 on the backing member 28. Preferably, in order to guard against unintentional locking of the wheels, the wedges face so that when the vehicle is moving forward, the friction of the brake urges disk 36 backward against the pull of link 40, thus tending to release the brake and guarding against locking by an excessive "servo" action.

While one illustrative embodiment of the invention has been described in detail, it is not my intention to limit its scope to that particular embodiment, or otherwise than by the terms of the appended claims.

I claim:

1. A vehicle comprising, in combination, a wheel having an integral radial flange, a nonrotatable member having a backing surface on one side of said flange and having an overhanging flange on the opposite side thereof, a disk between the wheel flange and the backing surface, and means acting on the disk and said nonrotatable member to cause them to grip the wheel flange between them.

2. A vehicle comprising, in combination, a wheel having a radial flange, a nonrotatable plate having a backing surface on one side of said flange and having an overhanging flange on the opposite side thereof, a disk between the wheel flange and the backing surface, the backing surface and said disk having co-operating wedges, and means for rocking the disk to cause the wedges to force the disk and overhanging flange toward each other to grip the wheel flange.

3. A vehicle comprising, in combination, a wheel having a radial flange, a nonrotatable plate having a backing surface on one side of said flange and having an overhanging flange on the opposite side thereof, a disk between the wheel flange and the backing surface, the backing surface and said disk having co-operating wedges, and means for rocking the disk to cause the wedges to force the disk and overhanging flange toward each other to grip the wheel flange, the wedges being so arranged that the friction when the vehicle is moving forward tends to release the brake by turning said disk backward.

4. A vehicle comprising, in combination, an axle housing, a wheel having a radial flange, a nonrotatable member having a backing surface on one side of said flange and having an overhanging flange on the opposite side thereof, a disk between the wheel flange and the backing surface, and means acting on the disk and said nonrotatable member to cause them to grip the wheel flange between them, together with a spring surrounding said axle housing urging the nonrotatable member axially outwardly to prevent drag of the brake when released.

5. A backing plate for a disk brake, having an outer overhanging flange, the flange being made separate from and secured to the plate at its edge, said plate and flange defining an inwardly-facing channel.

6. A vehicle comprising, in combination, a wheel having a braking surface thereon, a floating nonrotatable member having a backing surface on one side of said first-mentioned surface and having an overhanging flange on the opposite side thereof, a floating disk member between said first-mentioned surface and the backing surface, the backing surface and said floating disk having means thereon co-operating with means for rocking the disk to force the disk and floating nonrotatable member away from each other to grip the first-mentioned braking surface.

7. A disk brake comprising, in combination, a fixed central housing, rotatable and nonrotatable friction disks, one of which disks is supported directly by said housing and has a limited universal movement to permit it to align itself in parallelism with the other.

JACOB L. PRICE.